Figure 1:
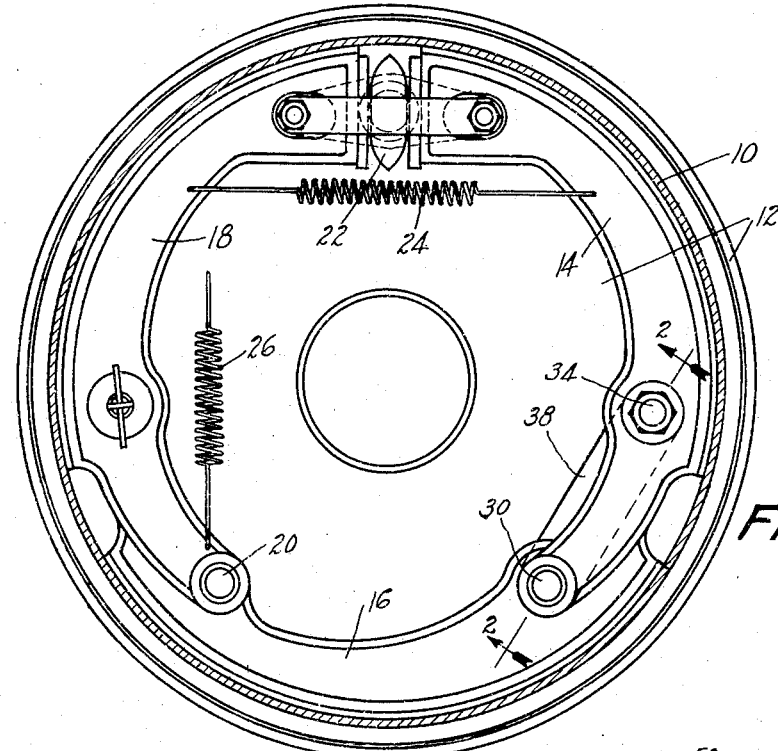

June 19, 1928.

V. BENDIX 1,674,313

BRAKE ADJUSTMENT

Filed Aug. 17, 1925

INVENTOR
VINCENT BENDIX
BY
*M. W. McConkey*
ATTORNEY

Patented June 19, 1928.

1,674,313

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKE ADJUSTMENT.

Application filed August 17, 1925. Serial No. 50,655.

This invention relates to brakes, and is illustrated as embodied in an automobile three-shoe brake. An object of the invention is to provide an improved adjustment for wear, preferably arranged to adjust a pair of friction devices simultaneously. In one desirable arrangement, manipulation of the anchor of one friction device operates means shifting the anchor of the other, for example through a reinforcing plate connecting the two anchors.

In the drawings the friction devices are illustrated as overlapping shoes with anchors adjustable in opposite directions by shifting the reinforcing plate. In a three-shoe brake, or other brake in which one friction device is longer than the other, it is preferable that the adjustments of the two devices should be at rates proportioned to their lengths,—i. e. in a three-shoe brake the two connected shoes, sustaining more wear than the single reverse shoe, should be adjusted at a rate approximately double the rate of adjustment of the single shoes.

Figure 2:
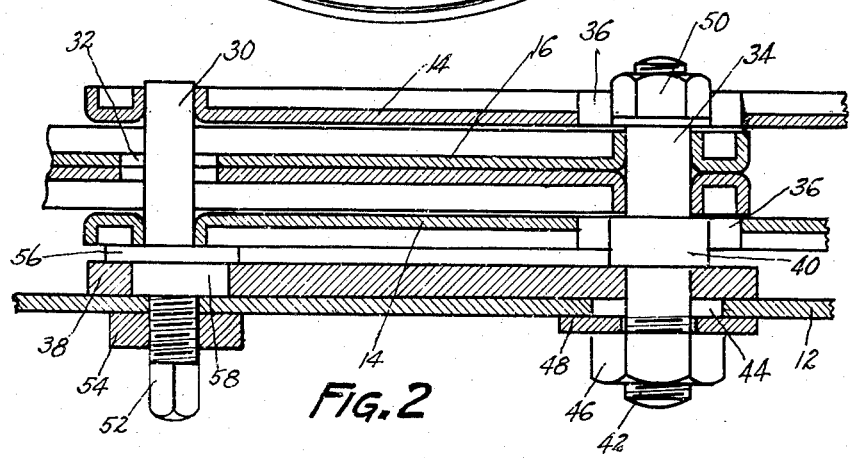

The above and other objects and features of the invention, including various novel combinations of parts and desirable particular constructions, will be apparent from the following description of one illustrative embodiment shown in the accompanying drawings, in which:

Fig. 1 is a vertical section through the brake, just inside the wheel, and showing the shoes in side elevation; and Fig. 2 is a section on the line 2—2 of Fig. 1, showing the adjustment of the anchors.

The illustrated brake includes a drum 10 and a backing plate 12, between which are arranged a reverse shoe 14, a central shoe 16, and a servo shoe 18. Each of the shoes 14 and 18, which are interchangeable, is forked at its end to provide substantially parallel arms straddling the corresponding end of shoe 16, and the arms of the servo shoe 18 are pivotally connected to shoe 16 by a pivot pin 20. The shoes are forced outwardly against the drum by a double cam 22 against the resistance of return springs 24 and 26.

The reverse shoe 14 is provided with an anchor 30 passing through an opening 32 in shoe 16, the opening being large enough so that the anchor does not interfere with the movements of shoe 16. Similarly an anchor 34 for shoe 16 is arranged in relatively large openings 36 in the arms of shoe 14. A reinforcing plate 38, for the relatively light backing plate 12, is arranged to connect the two anchors.

Anchor 34 has an enlargement 40 engaging the reinforcing plate 38, beyond which is a part 42 extending through the reinforcing plate and through an opening 44 in the backing plate 12, the opening permitting adjustment of the anchor by shifting the reinforcing plate. A nut 46 and washer 48 clamp the parts together to preserve the adjustment so made. A nut 50 on the other end of anchor 34 holds shoe 16 laterally.

There is also a part 52 of anchor 30 which extends through the backing plate 12, where it is provided with a squared end by which it may be turned angularly and with a locknut 54 to clamp it in any desired angular position. Between part 52 and the anchor proper there is an enlargement 56 serving as a head to engage and clamp the reinforcing plate 38, and a cylindrical eccentric 58 fitting closely in a corresponding opening in the reinforcing plate. It will be seen that turning part 52 of the anchor causes eccentric 58 to shift the reinforcing plate 38 to adjust anchor 34.

Preferably anchor 30 is also arranged eccentrically of part 52, its eccentricity being opposite to that of eccentric 58,—i. e. the axis of anchor 30 and the axis of eccentric 58 are on opposite sides of the axis of part 52. As the total wear on shoes 18 and 16 is usually approximately double the wear on shoe 14, ordinarily the distance between the axis of anchor 30 and the axis of part 52 will be approximately one-half the distance between the axis of part 52 and eccentric 58. Thus turning part 52 will shift the two anchors toward each other to take up for wear, but anchor 34 will be moved approximately twice as far as anchor 30, the rates of movement being substantially in proportion to the lengths of the two friction devices.

It will also be noted that opening 44 permits adjustment of anchor 34 radially of the drum in an arc about anchor 30 as an axis, by loosening nut 46 and tapping it with the wrench, then tightening it up again to preserve the adjustment.

While one illustrative embodiment has been described in detail, it is not my intention to limit the scope of the invention to that particular embodiment, or otherwise than by the terms of the appended claims.

I claim:

1. A brake having, in combination, a pair of shoes, an anchor for each shoe, and means for adjusting the relative positions of the two anchors including a reinforcing plate shifted lengthwise during the adjustment.

2. A brake having, in combination, a pair of shoes, an anchor for each shoe, and means for simultaneously adjusting the two anchors including a reinforcing plate for the anchors which is shifted bodily during the adjustment.

3. A brake having, in combination, friction means, an anchor for the friction means, a reinforcing plate in which the anchor is mounted, and means for shifting the reinforcing plate bodily to adjust the anchor.

4. A brake having, in combination, friction means, an anchor for the friction means, a plate in one end of which the anchor is mounted, and means engaging the other end of the plate for shifting it to adjust the anchor.

5. A brake having, in combination, friction means, an anchor for the friction means, a plate carrying the anchor, and means for shifting the plate bodily lengthwise to adjust the anchor.

6. A brake having, in combination, a pair of friction devices of different lengths, an anchor for each device between the ends of the other device, and means engaging the two anchors and operable to adjust them simultaneously in opposite directions at rates in proportion to their length.

7. A brake having, in combination, a pair of friction devices of different lengths, an anchor for each device, and means engaging the two anchors and operable to adjust them simultaneously in opposite directions at rates in proportion to their lengths.

8. A brake having, in combination, a pair of friction devices of different lengths, an anchor for each device, an adjusting device, and means operated by adjusting said device in a given amount to adjust the anchors differently and in proportion to their lengths.

9. A brake having, in combination, a pair of friction devices, one approximately twice as long as the other, an anchor for each device, an adjusting device, and means operated by adjusting said device in a given amount to adjust both anchors and to move one anchor approximately twice as far as the other.

10. A brake having, in combination, a drum, two friction devices of different lengths, means for determining the positions of the two friction devices with respect to the drum, and means for adjusting said position-determining means to take up for wear on the friction devices in proportion to their lengths.

11. A brake having, in combination, a drum, two friction devices of different lengths, a part for determining the position of each friction device with respect to the drum, and means for adjusting both of said position-determining parts to take up for wear on the friction devices and for moving them differently at rates proportioned to the lenghts of the corresponding friction devices.

12. A brake having in combination, a drum, a reverse shoe and a pair of connected shoes within the drum, parts for determining the position of the reverse shoe and one end of one of the connected shoes with respect to the drum, and a device for adjusting said parts in opposite directions to take up for wear and for moving the part engaging the one of the connected shoes approximately twice as far as the part engaging the reverse shoe.

13. A brake having, in combination, a drum, a reverse shoe and a pair of connected shoes within the drum, anchors for the reverse shoe and for one of the connected shoes, and a device for adjusting said anchors in opposite directions to take up for wear and for moving the anchor of the one of the connected shoes approximately twice as far as the anchor of the reverse shoe.

14. A brake having, in combination, two shoes, each having an anchor, a reinforcing plate engaging the anchors, and means for shifting the reinforcing plate to adjust the anchors.

15. A brake having, in combination, two shoes, each having an anchor, a reinforcing plate engaging the anchors, and means to adjust one anchor and to shift the reinforcing plate to adjust the other anchor.

16. A brake having, in combination, a backing plate having a reinforcing plate, a friction device having an anchor engaging the reinforcing plate, and means for shifting the reinforcing plate to adjust the anchor relatively to the backing plate.

17. A brake having, in combination, a backing plate having a reinforcing plate, a friction device having an anchor mounted in and carried by the reinforcing plate, and means for shifting the reinforcing plate to adjust the anchor relatively to the backing plate.

18. A brake having, in combination, a pair of overlapping shoes, an anchor for each shoe at the overlapped ends, a member connecting the anchors, and means for shifting said member to adjust the anchors.

19. A brake having, in combination, a pair of overlapping shoes, an anchor for each shoe at the overlapped ends, a member connecting the anchors, and means operated by manipulation of one anchor for shifting said member to adjust the other anchor.

20. A brake having, in combination, a pair of overlapping shoes, a connecting member, an anchor for the overlapped end of one shoe carried by said connecting member, and an anchor for the overlapped end of the other shoe having an adjustable eccentric engaging said member.

21. A brake having, in combination, a pair of overlapping shoes, a connecting member, an anchor for the overlapped end of one shoe carried by said connecting member, an angularly adjustable part having an eccentric engaging said member, and an anchor for the other shoe eccentrically carried by said adjustable part.

22. A brake having, in combination, a pair of overlapping shoes, a connecting member, an anchor for the overlapped end of one shoe carried by said connecting member, and an anchor for the overlapped end of the other shoe having an adjustable eccentric engaging said member, said eccentric and said eccentric anchor being offset in opposite directions so that turning the adjustable part moves the two anchors in opposite directions.

23. A brake having, in combination, a drum, shoes engageable with the drum, an anchor for each shoe between the ends of the other, one of the anchors being adjustable substantially radially of the drum, and a member connecting the two anchors and causing the adjustable anchor to swing on an arc about the other anchor.

24. A brake having, in combination, a drum, a pair of shoes engageable with the drum, an anchor for each of the shoes, one of the anchors being adjustable substantially radially of the drum, and a member connecting the two anchors and causing the adjustable anchor to swing on an arc about the other anchor.

25. A brake having, in combination, a drum, shoes engageable with the drum, an anchor for each shoe between the ends of the other, a plate having a relatively large opening for one anchor permitting its adjustment, and a member connecting the two anchors.

26. A brake having in combination a drum, shoes engageable with the drum, an anchor for each shoe between the ends of the other, a plate having a relatively large opening for one anchor permitting its adjustment, and means to clamp the two anchors to the plate.

In testimony whereof I have hereunto signed my name.

VINCENT BENDIX.